(12) United States Patent
Baker et al.

(10) Patent No.: US 7,475,569 B2
(45) Date of Patent: Jan. 13, 2009

(54) EXHAUST POSITIONED AT THE DOWNSTREAM END OF A GLASS MELTING FURNACE

(75) Inventors: David J. Baker, Newark, OH (US); Harry P. Adams, Granville, OH (US); John R. Leblanc, Maumee, OH (US)

(73) Assignees: Owens Corning Intellectual Captial, LLCDE (US); The BOC Grpoup, Inc. NJ (US)

( * ) Notice: Subject to any disclaimer, the term of this patent is extended or adjusted under 35 U.S.C. 154(b) by 155 days.

(21) Appl. No.: 10/712,904

(22) Filed: Nov. 13, 2003

(65) Prior Publication Data

US 2004/0131988 A1    Jul. 8, 2004

(51) Int. Cl.
C93B 3/00    (2006.01)

(52) U.S. Cl. .............................. 65/335; 65/337; 65/346; 65/347; 65/135; 432/195

(58) Field of Classification Search .................. 65/335, 65/337, 346, 347, 135, 136, 134.4, 134.1; 432/195; 373/33
See application file for complete search history.

(56) References Cited

U.S. PATENT DOCUMENTS

| | | | | |
|---|---|---|---|---|
| 3,525,604 A | * | 8/1970 | Dornick | .......................... 75/502 |
| 3,552,949 A | * | 1/1971 | Boyle | .......................... 75/638 |
| 3,592,623 A | * | 7/1971 | Shepherd | .................... 65/134.4 |
| 4,046,547 A | | 9/1977 | Pieper | |
| 4,213,753 A | | 7/1980 | Negroni et al. | |
| 4,473,388 A | | 9/1984 | Lauwers | |
| 4,481,024 A | * | 11/1984 | Bly | .............................. 65/337 |
| 4,540,361 A | | 9/1985 | Gagne | |
| 4,604,123 A | | 8/1986 | Desprez et al. | |
| 4,737,178 A | | 4/1988 | Reifschneider et al. | |
| 4,944,785 A | | 7/1990 | Sorg et al. | |
| 5,116,399 A | | 5/1992 | Lauwers | |
| 5,139,558 A | | 8/1992 | Lauwers | |
| 5,169,424 A | | 12/1992 | Grinnen et al. | |
| 5,417,432 A | | 5/1995 | Shamp et al. | |
| 5,500,030 A | | 3/1996 | Joshi et al. | |
| 5,807,418 A | | 9/1998 | Chamberland et al. | |
| 5,814,121 A | | 9/1998 | Travis | |
| 5,823,769 A | | 10/1998 | Joshi et al. | |
| 5,925,165 A | * | 7/1999 | Pflugl et al. | ................. 75/10.41 |
| 5,934,899 A | | 8/1999 | Joshi et al. | |
| 6,079,229 A | | 6/2000 | Legiret et al. | |
| 6,101,847 A | | 8/2000 | Shamp et al. | |
| 6,109,062 A | | 8/2000 | Richards | |
| 6,210,151 B1 | | 4/2001 | Joshi et al. | |
| 6,233,974 B1 | | 5/2001 | Anderson et al. | |
| 6,237,369 B1 | * | 5/2001 | LeBlanc et al. | ............. 65/134.1 |
| 6,422,041 B1 | | 7/2002 | Simpson et al. | |
| 6,436,337 B1 | | 8/2002 | Gross | |
| 6,519,973 B1 | * | 2/2003 | Hoke et al. | ................. 65/134.4 |
| 6,705,118 B2 | | 3/2004 | Simpson et al. | |
| 7,168,269 B2 | | 1/2007 | Simpson et al. | |
| 2001/0039813 A1 | * | 11/2001 | Simpson et al. | ............. 65/134.4 |
| 2003/0188554 A1 | | 10/2003 | Baker et al. | |
| 2006/0179886 A1 | | 8/2006 | Adams et al. | |
| 2007/0119213 A1 | | 5/2007 | Simpson et al. | |

FOREIGN PATENT DOCUMENTS

| | | |
|---|---|---|
| DE | 9206502 | 10/1992 |
| EP | 0 508 139 | 3/1992 |
| EP | 0 546 238 | 3/1992 |
| EP | 0 789 191 | 8/1997 |
| EP | 0 808 806 | 11/1997 |
| EP | 1 077 201 B1 | 11/2005 |
| GB | 325238 | 2/1930 |
| JP | 05078133 | 3/1993 |
| SU | 1836603 | 8/1993 |
| WO | WO 94/06724 | 3/1992 |
| WO | WO 02/092521 A1 | 11/2002 |
| WO | WO 03/084885 | 10/2003 |

OTHER PUBLICATIONS

Schnepper et al., Coupled Combustion Space-Glass Bath Modeling of a Float Glass Melting Tank Using Full Oxy-Combustion, Advances in Fusion and Processing of Glass II, pp. 219-224.
Glass Making Today, edited by P.J. Doyle, Portcullis Press, first publication 1979, pp. 119-120.
A Modeling Study Comparing an Air- and Oxy-Fuel Fired Float Glass Melting Tank, International Congress on Glass, San Francisco, Jul. 1998.

* cited by examiner

Primary Examiner—Mark Halpern
(74) Attorney, Agent, or Firm—James J. Dottavio (57) ABSTRACT

A glass-melting furnace (10) has an upstream end (6), a downstream end (8), and a roof (22). The upstream end is positioned upstream of the downstream end. A charger (32) is provided to supply glass-forming material (30) to the upstream end of the furnace. At least one burner (34) is provided to supply heat to the glass-forming material at the upstream end of the furnace. An exhaust (60) is in communication with the downstream end of the furnace, with the exhaust being positioned downstream of the at least one burner.

28 Claims, 6 Drawing Sheets

EXHAUST POSITIONED AT THE DOWNSTREAM END OF A GLASS MELTING FURNACE

This application claims priority from PCT Patent Application Ser No. PCT/US01/15967 filed May 16, 2001.

FIELD OF THE INVENTION

This invention relates to a glass-melting furnace of the type in which glass batch is deposited at one end and molten glass is removed from the other end. More particularly, this invention relates to a glass-melting furnace having at least one gas burner for melting the glass batch.

BACKGROUND OF THE INVENTION

Glass-melting furnaces of many types have been commonly employed to melt glass-forming materials in the manufacture of glass products, such as fiberglass, container glass, flat glass and other types of glass. Such a glass-melting furnace typically includes a charger to introduce glass batch, at least one burner to melt the glass batch into molten glass, and at least one exhaust stack to remove combustion gases from the furnace. In a cross-fired furnace, heat is introduced into the furnace from burners positioned on opposing sides of the furnace. The heat melts the glass, or batch, in the furnace. The glass batch is generally added to the furnace at the rear, or charging end of the furnace to allow for optimal melting of the glass batch to molten glass. The molten glass is removed from the front, or downstream end of the furnace, through a glass evacuation channel referred to as a throat in furnaces for melting glass for manufacturing fiberglass, and referred to as a waist in furnaces for melting glass for manufacturing flat glass.

The combustion fumes and gases released from the decomposition of the glass-forming raw materials are transferred or removed from the furnace through one or more exhaust stacks positioned on opposite sides near the rear or charging end of the furnace, that is, on the opposite end of the furnace from the throat or point of glass discharge from the furnace. The reason for positioning the exhaust stacks in the rear of the furnace is to conserve energy while still maintaining acceptable melting of the batch. By exhausting the gases from of the charge end of the furnace, there is the opportunity to recover significant amounts of the energy from all the exhaust gases generated in the furnace. However, positioning the exhaust stacks at the charge end of the furnace leads to batch being entrained in the gases of combustion, and thus fouling of the exhaust stacks or other equipment, and potentially increasing the particulate from the furnace exhaust system. It would thus be desirable to design a more efficient furnace that does not have the disadvantages of known furnaces.

SUMMARY OF THE INVENTION

The above objects as well as other objects not specifically enumerated are achieved by a glass-melting furnace having an upstream end, a downstream end, and a roof. The upstream end is positioned upstream of the downstream end. A charger is provided to supply glass-forming material to the upstream end of the furnace. At least one burner is provided to supply heat to the glass-forming material at the upstream end of the furnace. An exhaust is in communication with the downstream end of the furnace, with the exhaust being positioned downstream of the at least one burner.

According to this invention there is also provided a glass-melting furnace having an upstream end with a charge end wall and a downstream end with a discharge end wall. The upstream end is positioned upstream of the downstream end. An exhaust is in communication with the furnace at the downstream end of the furnace.

According to this invention there is also provided a method of operating a glass-melting furnace having an upstream end and a downstream end. The method includes introducing glass-forming material to the upstream end of the furnace. The glass-forming material is heated with at least one burner, the at least one burner being located at the upstream end of the furnace. Gases of combustion in the furnace are exhausted from an exhaust positioned at the downstream end of the furnace.

According to this invention there is also provided a method of operating a glass-melting furnace having a charge half and a discharge half. The method includes introducing glass-forming material to the charge half of the furnace. The glass-forming material is heated with a plurality of burners, the burners providing energy and forming gases of combustion. The majority of the energy from the burners is introduced to the furnace in the charge half of the furnace. The gases of combustion are exhausted from an exhaust connected to the discharge half of the furnace.

According to this invention there is also provided a method of exhausting gases of combustion from a glass-melting furnace. The method includes introducing glass-forming material into an upstream end of a glass-melting furnace. A pressure differential between the upstream end of the furnace and a downstream end of the furnace, with the pressure in the downstream end of the furnace being lower than the pressure of the upstream end of the furnace. Combustion fumes and gases are exhausted from an exhaust in communication with the downstream end of the furnace, with the pressure in the exhaust being lower than the pressure in the downstream end of the furnace. Molten glass is discharged from the downstream end of the furnace.

It is an object of the present invention to provide a glass-melting furnace having an exhaust positioned at a downstream end.

It is another object of the present invention to provide an exhaust positioned at a downstream end of a glass-melting furnace to increase the residence time of exhaust gases, thereby providing a more cost effective heating and melting of the glass-forming material.

Various other objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
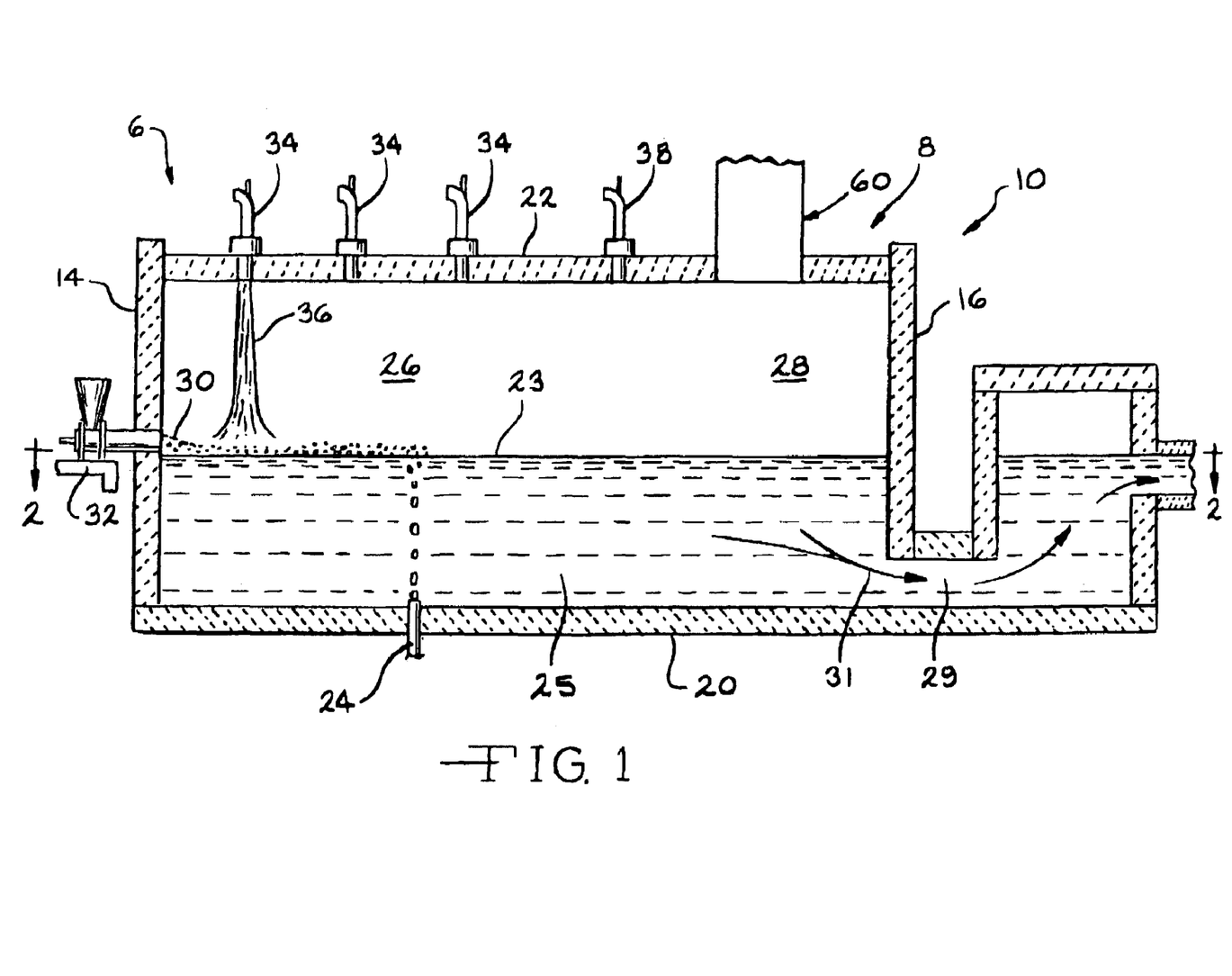
FIG. 1 is a cross-sectional elevational view of a glass-melting furnace in accordance with the present invention.
Figure 2:
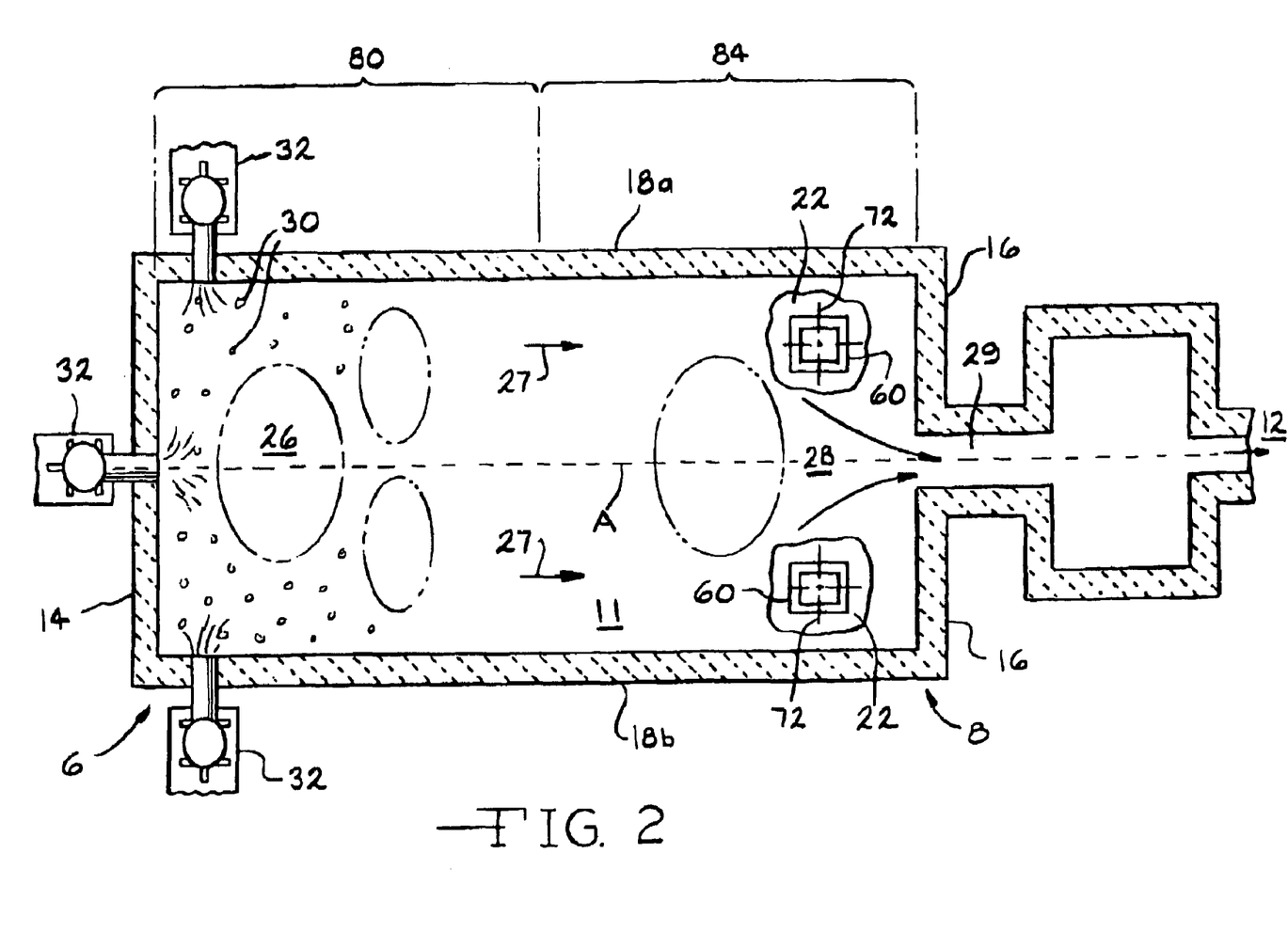
FIG. 2 is a cross-sectional plan view of the glass-melting furnace of FIG. 1 taken along line 2-2, with a portion of the roof shown for clarity.

Referring to FIGS. 1 and 2, there is shown a glass-melting furnace 10, which can be used to manufacture fiberglass, container glass, flat glass and other types of glass. The glass-melting furnace 10 is operative to provide molten glass to a glass forehearth 12 or other glass processing equipment. In considering the figures, it will be appreciated that for purposes of clarity certain details of construction are not provided in view of the fact that such details are conventional and well within the skill of the art once the invention is disclosed and explained.

The glass-melting furnace 10 preferably includes an elongated channel 11 defined by a charge end wall 14 and a discharge end wall 16, two side walls 18a and 18b, a floor 20 and a roof 22. The roof 22 is preferably operatively connected to the first or charge end wall 14 and the second or discharge end wall 16. The charge end wall 14 is positioned at an upstream end 6 of the glass-melting furnace 10, where the glass-forming material is introduced or charged into the furnace. The discharge end wall 16 is positioned at a downstream end 8 of the glass-melting furnace 10, where the discharge of the molten glass from the furnace occurs. The upstream end 6 of the glass-melting furnace 10 is a charge end. As used in this specification and claims, the term "downstream end" means the end of the furnace from which the molten glass is discharged. The glass-melting furnace 10 is preferably made from appropriate refractory materials such as alumina, silica, alumina-silica, zircon, zirconia-alumina-silica and the like. The roof 22 of the glass-melting furnace 10 has a conventional curvilinear cross-sectional shape or crowned shape when viewed transverse to a longitudinal axis "A" of the channel, although the roof 22 may be of any suitable design. The roof 22 of the glass-melting furnace 10 is positioned above a surface 23 of molten glass 25. As is well known in the art, the glass-melting furnace 10 may optionally include one or more bubblers 24 and/or electrical boost electrodes (not shown). The bubblers 24 and/or electrical boost electrodes increase molten glass circulation and glass melting rates.

The glass-melting furnace 10 preferably includes two molten glass zones, a generally upstream melting zone 26 and a generally downstream fining zone 28. The melting zone 26 is considered the upstream zone of the glass-melting furnace 10 wherein the glass-forming material 30 is charged into the glass-melting furnace 10 using a charger or charging device 32. The charging device 32 may be of any type suitable for depositing glass-forming material 30 into the glass-melting furnace 10. The glass forming material 30 may be a mixture of raw materials typically used in the manufacture of glass, such as for example glass batch. It will be appreciated that the glass-forming material 30 make-up is dependent on the type of glass product (not shown) being produced. Normally, the material includes silica-containing materials including finely ground scrap glass commonly referred to as cullet. Other glass-forming materials including feldspar, limestone, dolomite, soda ash, potash, borax and alumina may also be used. To alter the properties of the glass product a relatively minor amount of arsenic, antimony, sulfates, carbon and/or fluorides may also be added. It will be appreciated that the molten glass 25 generally freely flows in an unimpeded manner from the upstream end 6 of the glass-melting furnace 10 to the downstream end 8 of the glass-melting furnace 10, as indicated by the arrows 27. It will also be noted that the elongated channel 11 contains no obstructions to impede such flow of the molten glass.

Any suitable number and type of charging devices 32 may be employed to deliver the glass-forming material 30 into the glass-melting furnace 10. The illustrated glass-melting furnace 10 includes three charging devices 32 positioned in the charge end wall 14 and the two side walls 18a and 18b, respectively. As shown, the illustrated charging devices 32 are generally positioned at the upstream end 6 of the glass-melting furnace 10. The glass-forming material 30 is preferably delivered onto the surface 23 of molten glass 25.

Figure 3:
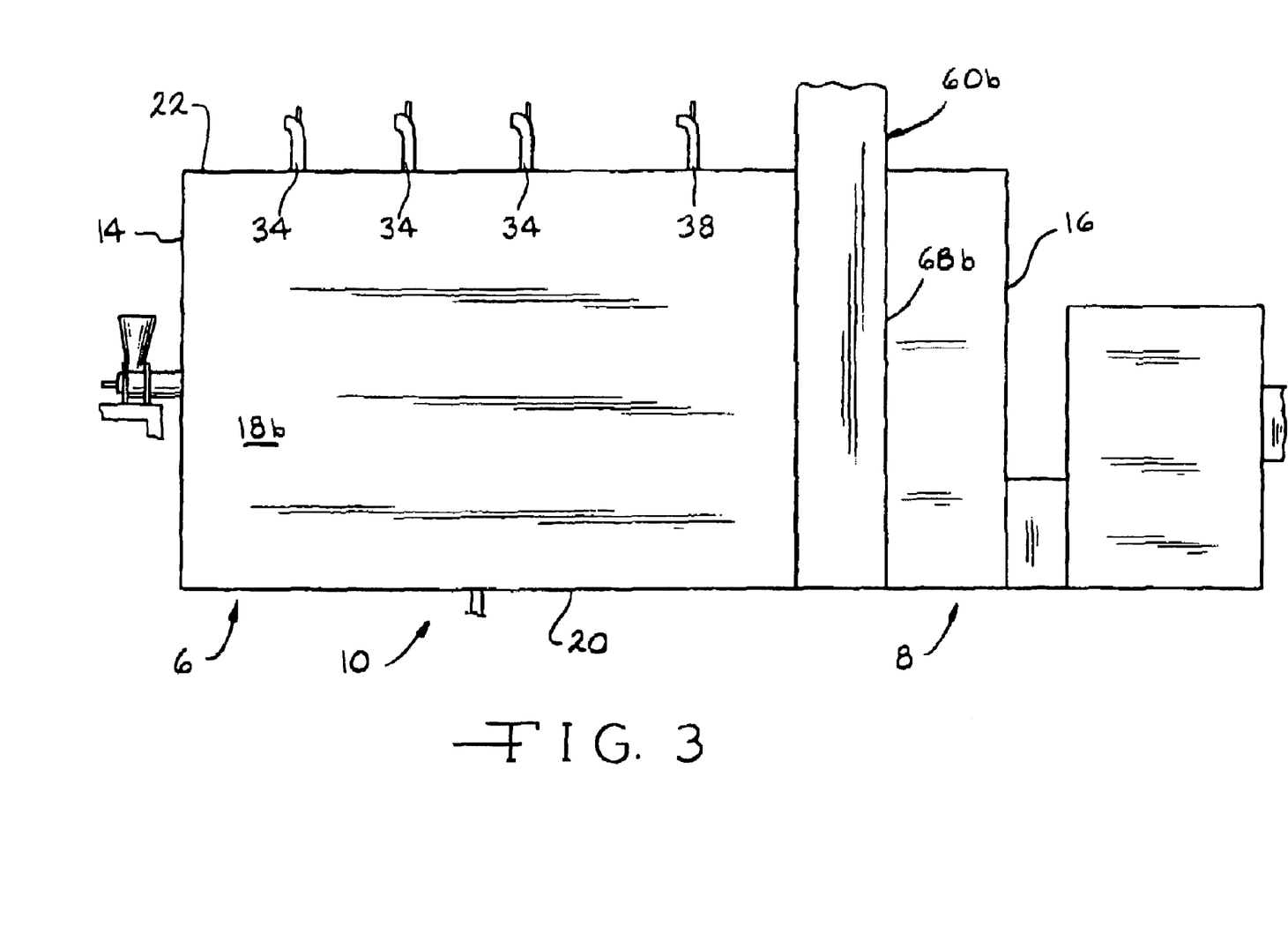
FIG. 3 is a schematic elevational view of an alternate embodiment of a glass-melting furnace in accordance with the present invention.
Figure 4:
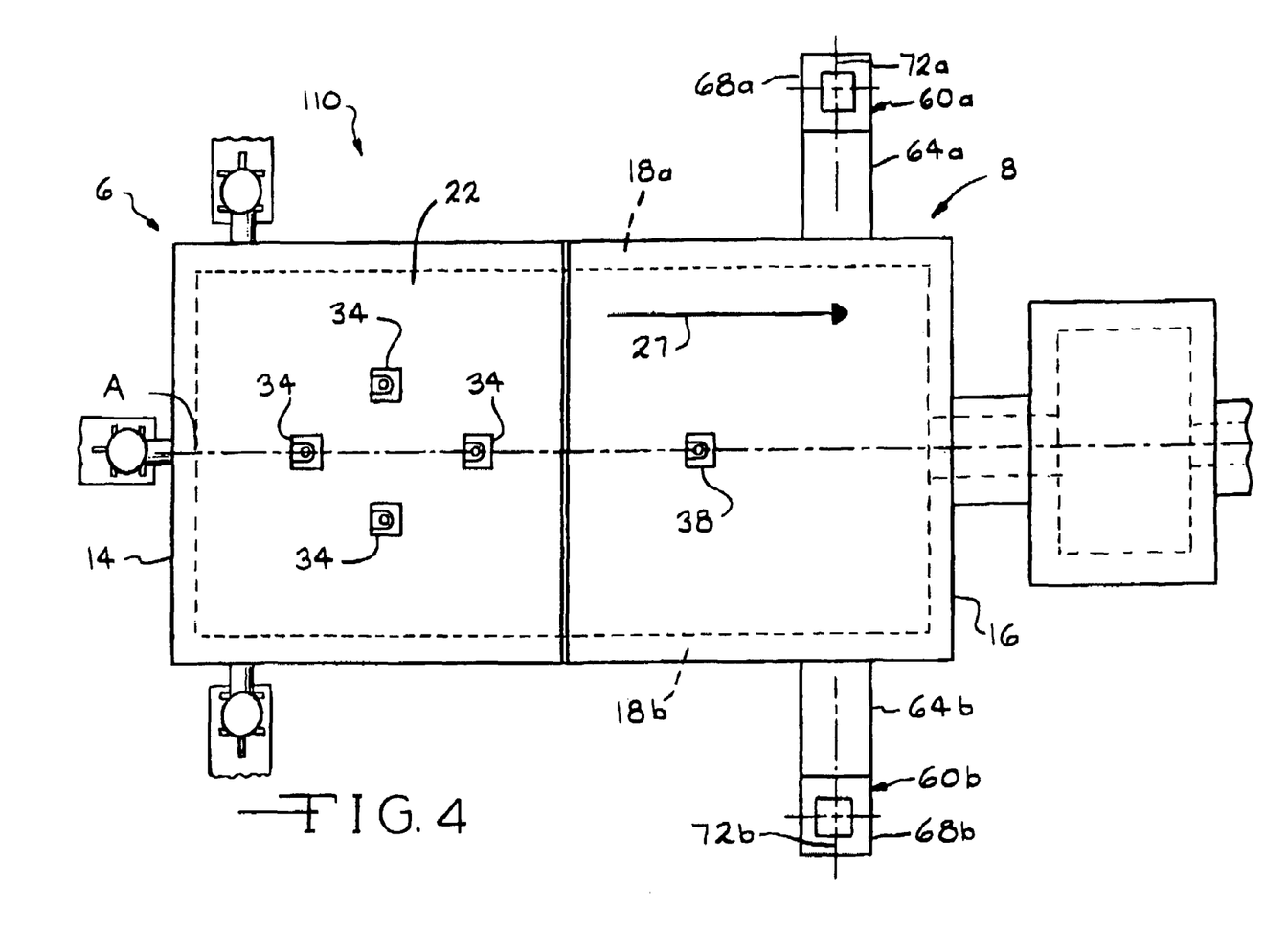
FIG. 4 is a schematic plan view of the glass-melting furnace of FIG. 3 taken along line 4-4.

The glass-forming material 30 forms a batch layer of solid or semi-melted particles on the surface of the molten glass 25 in the melting zone 26 of the glass-melting furnace 10. The floating solid batch particles of the glass-forming material 30 are melted principally by at least one burner, although a plurality of burners 34 are preferably used, as shown in FIGS. 1 and 4. The burners 34 are preferably oxygen-fuel burners, although any suitable type of burner may be employed. The burners 34 preferably provide a flame 36 of controlled shape and length. In a preferred embodiment of the invention the burners at the charging end 6 are mounted through the roof 22, as shown in FIGS. 1, 3 and 4. However, it is to be understood that the burners can be mounted in or through the charge wall 14 or the side walls 18a and 18b of the glass-melting furnace 10. The burners 34 melt the glass-forming material 30 and, at the same time, maintain the operating temperature of the surrounding refractory material within acceptable operating limits. Significant quantities of combustion gases are generated by the oxidation of the gas from the burner.

After the glass-forming material is melted by the flames 36 and by heat radiated from other parts of the furnace, the molten glass freely flows in an unimpeded manner from the melting zone 26 in the direction of directional arrow 27 to the fining zone 28. It will also be noted that the elongated channel 11 contains no obstructions to impede such flow of the molten glass. The molten glass exits the furnace 10 through the furnace throat 29, or through a channel known as a waist in the flat glass industry, as indicated by the directional arrow 31. In a preferred embodiment for specific glasses, the fining zone 28 includes at least one downstream burner 38 mounted in the roof 22 of the glass melting furnace 10. The downstream burner 38 can be similar in design to the burners 34. Optionally, any one or more of the upstream burners 34 can be mounted at an angle of up to about 20 degrees to the vertical to maximize convective and radiative heat transfer to the glass forming batch material. Likewise, the downstream end burner 38 can be mounted at an angle of up to about 20 degrees to the vertical to minimize and/or control foam formation on the glass surface 23 when operating with certain types of glasses such as fiberglass.

The glass-melting furnace 10 includes at least one exhaust 60, positioned at the downstream end 8, for removing the gases of combustion from the furnace. It is to be understood that alternatively a plurality of exhausts can be employed. For the glass-melting furnace 10 shown in FIGS. 1 and 2, the roof 22 of the glass-melting furnace 10 supports the exhausts 60. In a preferred embodiment of the invention, the exhausts are positioned outside the sidewalls 18a and 18b and supported in a different manner, as will be explained below.

In a preferred embodiment of the invention, the exhausts 60 are exhaust stacks for educting the combustion fumes and gases released from the decomposition of the glass-forming raw materials. It is to be understood that the exhausts can be any suitable type of opening or conduit for removing the fumes and gases from the furnace. Once the fumes and gases are removed from the furnace, they can optionally be treated in a manner to produce an environmentally friendly effluent. Where an exhaust stack is used, it can have a quadrilateral cross section, such as a square cross-section, although the exhausts 60 can have any suitable cross-sectional shape. In a preferred embodiment of the invention, the centerlines 72 of the exhausts are positioned at least about 70 percent of the distance from the charge end wall 14 of the glass-melting furnace to the discharge end wall 16 of the glass-melting furnace, as shown, for example, in FIG. 2. More preferably, the centerlines 72 of the exhausts are positioned at least about 80 percent of the distance from the charge end wall to the discharge end wall.

One of the advantages of providing the exhaust 60 in communication with the downstream end of the furnace is that there is a lower probability of any glass-forming materials to be entrained with the fumes and combustion gases. This is because the total mass flow of combustion products generated in the furnace of the invention does not pass over the glass forming materials, but instead only the combustion products from those burners upstream from the glass forming materials will pass over the glass-forming materials. In a conventional furnace the velocity of the gases will be greatest above the unmelted glass forming materials, thus enhancing the entrainment of these materials. In contrast, in the furnace of the invention, the velocity of the gases will not necessarily be the greatest above the glass-forming materials. Also, any glass forming materials entrained with the fumes and combustion gases will have a chance to settle out as the gases travel from the charge end 6 of the furnace to the downstream end 8. Another advantage in positioning the exhaust 60 in communication with the downstream end, particularly where the majority (more than 50 percent) of the burners 34 are positioned in the upstream end of the furnace, is that separation of the exhaust from the heat source eliminates a thermal short circuit that would occur if the burners and exhaust were positioned at the same end of the furnace.

An alternate embodiment of the glass-melting furnace 110 is shown in FIGS. 3 and 4. Features of the glass-melting furnace 110 having reference numbers the same as or similar to those of the glass-melting furnace 10 illustrated in FIGS. 1 and 2 have a similar function to those same features of furnace 10, unless otherwise indicated. The glass-melting furnace 110 includes two exhausts 60*a* and 60*b*. The exhausts 60*a* and 60*b* are in communication with the glass-melting furnace 110 and are operative to exhaust the gases of combustion produced by the burners 34 and 38. The exhausts 60*a* and 60*b* are positioned laterally outside the sidewalls 18*a* and 18*b*, respectively.

The exhausts 60*a* and 60*b* shown in FIGS. 3 and 4 include generally horizontal portions 64*a* and 64*b* and generally vertical portions 68*a* and 68*b*, respectively. The generally vertical portions 68*a* and 68*b* are spaced apart from the side walls 18*a* and 18*b* by the generally horizontal portions 64*a* and 64*b*, respectively. It should be noted that the exhausts 60*a* and 60*b* include centerlines 72*a* and 72*b*, respectively. As is the case for the furnace 10 shown in FIGS. 1 and 2, the centerlines 72*a* and 72*b* are positioned at least about 70 percent of the distance from the charge end wall 14 of the glass-melting furnace 110 to the discharge end wall 16 of the glass-melting furnace 110, and more preferably at least about 80 percent of the distance from the charge end wall to the discharge end wall. Although the exhaust stacks are shown as being laterally spaced apart from the sidewalls, the exhausts could be integrally formed in the side walls themselves. In such a case, the innermost portion of the generally vertical portions 68*a* and 68*b* of the exhausts 60*a* and 60*b* would be included in the sidewalls 18*a* and 18*b*, respectively.

Figure 5:
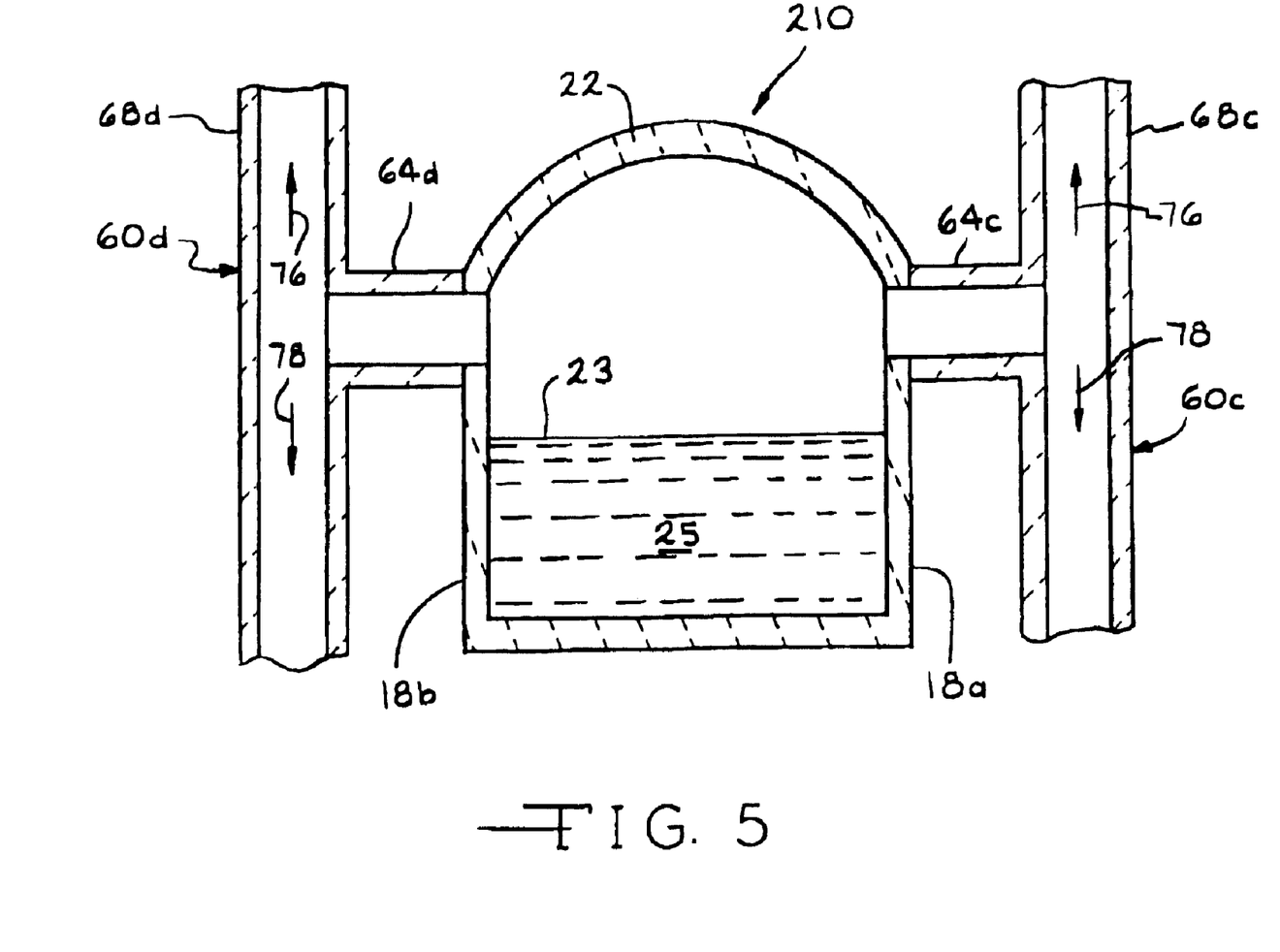
FIG. 5 is a cross-sectional end view in elevation of an alternate embodiment of a glass-melting furnace in accordance with the present invention.

Yet another alternate embodiment of the glass-melting furnace 210 is shown in FIG. 5. Features of the glass-melting furnace 210 having reference numbers the same as or similar to those of the glass-melting furnace 10 and the glass-melting furnace 110 have a similar function to those features of furnaces 10 and 110, unless otherwise indicated. The glass-melting furnace 210 shown in FIG. 5 includes exhausts 60*c* and 60*d*, which have a quadrilateral cross section, although they may have any suitable cross-sectional shape.

The exhausts 60*c* and 60*d* can be supported in any suitable manner. The exhausts 60*c* and 60*d* may be positioned at any suitable location adjacent or on the discharge end wall 16 and/or the side walls 18 to exhaust the gases of combustion from the furnace. As shown in FIG. 5, they can be separated laterally from the sidewalls 18. The exhausts 60*c* and 60*d* preferably include generally horizontal portions 64*c* and 64*d* and generally vertical portions 68*c* and 68*d*, respectively. The generally horizontal portions 64*c* and 64*d* are positioned above the surface 23 of the molten glass 25. The generally vertical portions 68*c* and 68*d* are spaced apart from the discharge end wall 16 and the side walls 18 by the generally horizontal portions 64*c* and 64*d*, respectively. In a preferred embodiment, the generally vertical portions 68*c* and 68*d* are operative to receive the gases of combustion and allow for removal in either the generally upward direction (indicated by arrows 76) or the generally downward direction (indicated by arrows 78).

The glass-melting furnaces 10, 110 and 210 all operate substantially similarly to produce molten glass 25. In operation, glass-forming material 30 is introduced to the upstream end 6 of the glass-melting furnace. Then, the glass-forming material is heated with the burners 34. The one or more burners 34 are preferably located at the upstream end 6 of the furnace. The burners 34 form gases of combustion, which are exhausted from the downstream end 8 of the glass-melting furnace.

The glass-melting furnaces 10, 110 and 210 can be operated by introducing glass-forming material 30 to a charge half 80 of the furnace, as shown in FIG. 2. As used in this context, the charge half 80 of the glass-melting furnace is understood to be that half of the glass-melting furnace nearest to the charge end wall 14. The glass-forming material 30 is heated with the one or more burners 34 located in the charge half 80 of the furnace. The burners 34 provide energy and form gases of combustion. The majority of the energy from all the burners associated with the furnace is introduced into the charge half 80 of the glass-melting furnace. Preferably, the energy from the burners introduced into the charge half of the furnace is at least twice the energy from the burners introduced to the discharge half of the furnace. The exhausts are positioned to exhaust the gases of combustion from the discharge half 84 of the furnace. As used in this context, the discharge half 84 of the glass-melting furnace is understood to be that half of the glass-melting furnace nearest to the discharge end wall 16. It can be seen that the exhausting of the combustion gases through the exhausts creates a flow of combustion gases within the furnace in a direction from the charge end wall of the furnace to the discharge wall of the furnace.

Figure 6:
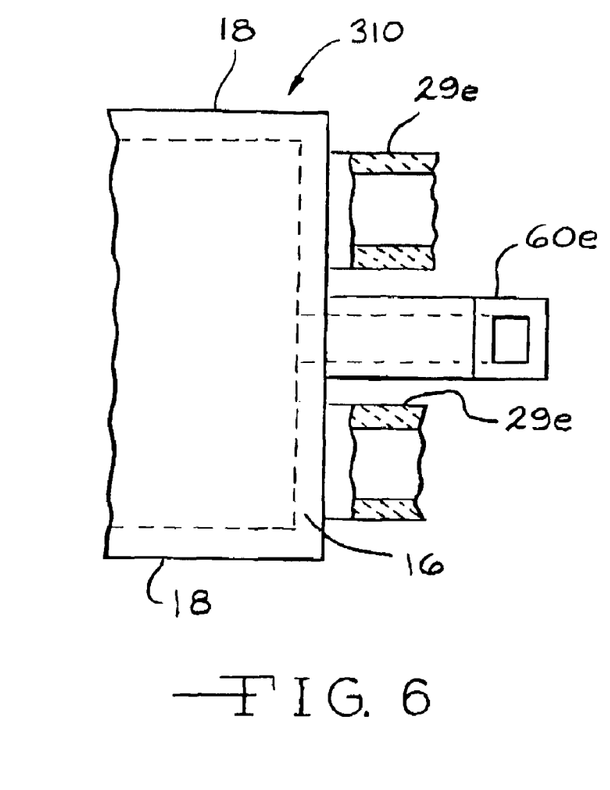
FIG. 6 is a schematic plan view of another alternate embodiment of the furnace having an exhaust connected through the discharge end wall of the furnace.

As shown in FIG. 6, in another embodiment of the invention, a glass-melting furnace 310 can be provided with one or more exhausts 60*e* which connects through the end wall 16 to the downstream end 8 of the furnace. Where there is a single exhaust 60e centered on the end wall 16, it is likely that two channels or throats 29e would be used to discharge molten glass from the furnace 310. The exhausts are typically structured and arranged so that they exhibit a relatively lower ambient pressure than the pressure in the furnace. This can be accomplished by using an exhaust in the form of a stack. Alternatively, a fan could be used to lower the pressure within the exhaust. Also, a pressure differential is established between the upstream end 6 of the furnace and a downstream end 8 of the furnace, with the pressure in the downstream end of the furnace being lower than the pressure of the upstream end of the furnace. It can be seen that by exhausting the combustion fumes and gases via the exhaust 60, which is in communication with the downstream end 8 of the furnace, the pressure in the exhaust will be lower than the pressure in the downstream end of the furnace.

Figure 7:
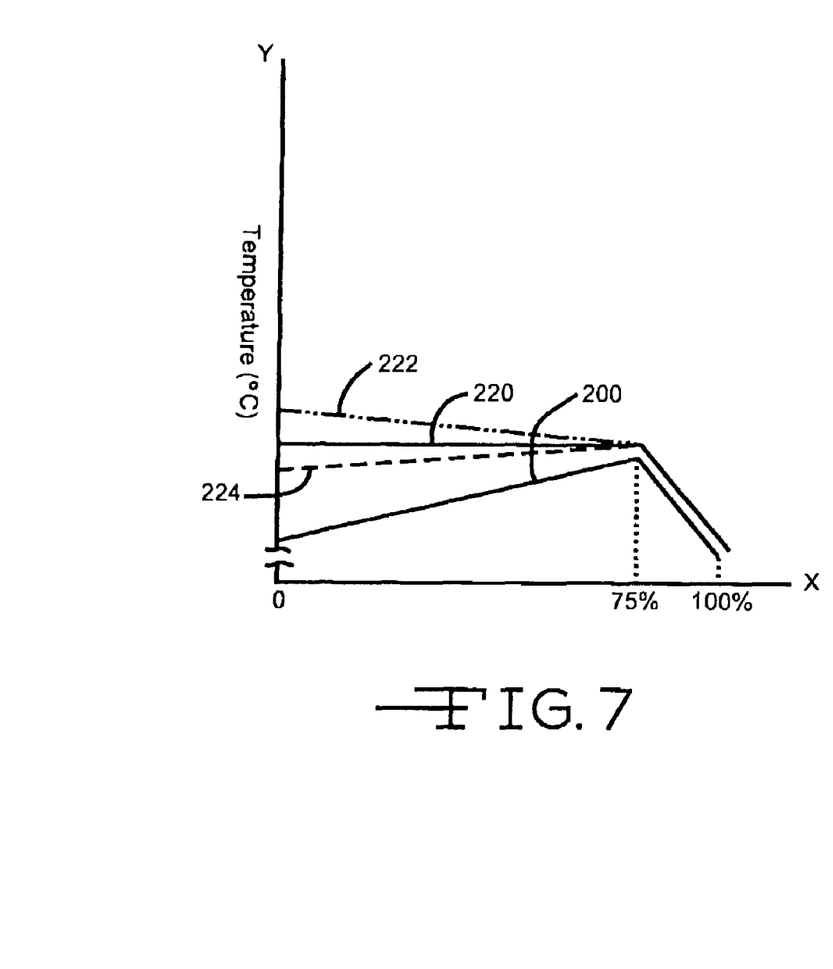
FIG. 7 is a graph showing the temperature profile of a prior art glass-melting furnace compared with the temperature profile of a glass-melting furnace in accordance with the present invention.

Referring now to FIG. 7, there is shown a comparison of the temperature (y-axis) and corresponding percentage distance from the charge end wall (x-axis) of the glass-melting furnace to the discharge end wall. Thus, the temperature at the 75 percent distance is the temperature approximately three-fourths of the distance from the charge end wall to the discharge end wall. Likewise, the temperature at the zero percent distance is the temperature at approximately the charge end wall. Likewise, the temperature at the 100 percent distance is the temperature at approximately the discharge end wall.

A typical prior art glass-melting furnace heat profile is indicated at 200. It will be appreciated that the temperature at the approximate 75 percent distance is a relative peak compared to the temperature at the zero percent distance and the 100 percent distance. Thus, the temperature in a conventional glass-melting furnace at the zero percent distance is less than the temperature at the 75 percent distance. Other furnaces might have the peak temperature at different distances from the charge end wall, such as at the 50 percent distance or at the 100 percent distance. A heat profile for the glass-melting furnace according to the invention is indicated at 220. It can be seen that the temperature throughout the first 75 percent of the furnace from the charge end wall is well above that of a conventional furnace, and there is no relatively cold portion at the upstream end of the furnace, in contrast to the conventional furnace heat pattern 200. The relatively low temperature seen at the zero percent distance of the prior art heat profile (graph 200) is not seen with the heat profile (graph 220) for the glass-melting furnace according to the invention. The comparatively higher temperature at the zero percent distance indicates that more efficient energy utilization and glass batch melting is expected with the glass-melting furnace according to the invention. If the furnace is operated with a slightly greater energy input than was the case for the furnace represented by graph 220, the temperature profile will be more elevated at the charge end of the furnace, as shown at graph 222. Likewise, if the furnace is operated with a slightly less energy input than was the case for the furnace represented by graph 220, the temperature profile will be slightly lower at the charge end of the furnace, as shown at graph 224.

Although the invention has been described in detail with reference to certain specific embodiments, those skilled in the art will recognize that there are other embodiments within the spirit and scope of the claims enclosed herewith.

What is claimed is:
1. A glass-melting furnace comprising:
an elongated channel consisting of a charge end wall, a discharge end wall, two side walls, a floor, and a roof, the elongated channel defining an upstream melting end, a downstream fining end through which molten glass is discharged, the upstream end being positioned upstream of the downstream end in the glass-melting furnace;
a charger supplying glass-forming material to the upstream end of the glass-melting furnace;
at least one burner supplying at least a majority of the heat to the glass-forming material at the upstream end of the glass-melting furnace;
the upstream end and the downstream end being configured to allow unimpeded flowing and blending of the glass-forming material; and
an exhaust disposed within the downstream end of the glass-melting furnace for exhausting combustion gases only from the downstream end of the glass-melting furnace, the exhaust further being positioned downstream of the at least one burner;
the exhaust disposed for allowing exhaust gases to provide additional heat to the melting glass-forming material, and for allowing at least some air-entrained glass-forming materials to scale back into the melting glass as exhaust gases travel from the upstream end to the downstream end.

2. The glass-melting furnace of claim 1 in which the at least one burner is mounted through the roof of the glass-melting furnace.

3. The glass-melting furnace of claim 1 in which the at least one burner is a plurality of burners.

4. The glass-melting furnace of claim 3 in which more than 50 percent of the burners are positioned upstream of the exhaust.

5. The glass-melting furnace of claim 4 in which all of the burners are positioned upstream of the exhaust.

6. The glass-melting furnace of claim 1 in which the exhaust is an exhaust stack.

7. The glass-melting furnace of claim 1 in which the exhaust is a plurality of exhaust stacks.

8. The glass-melting furnace of claim 1 in which the exhaust is disposed at a discharge end wall of the glass-melting furnace.

9. The glass-melting furnace of claim 1 in which the exhaust is disposed at a sidewall of the glass-melting furnace.

10. The glass-melting furnace of claim 1 in which the at least one burner is a plurality of burners mounted through the roof of the glass-melting furnace, all of the burners are positioned upstream of the exhaust outlets, and the exhaust comprises at least two exhaust outlets.

11. The glass-melting furnace of claim 10 in which the exhaust outlets are a plurality of exhaust stacks.

12. The glass-melting furnace of claim 11 in which the exhaust centerline is positioned at least about 80 percent of the distance from the charge end wall of the glass-melting furnace to the discharge end wall of the glass-melting furnace.

13. The glass-melting furnace of claim 1 further at least one downstream burner supplying heat to the downstream fining end.

14. The glass-melting furnace of claim 13 in which the downstream burner is mounted in the roof.

15. The glass-melting furnace of claim 14 in which at least one upstream burner is mounted at an angle of up to about 20 degrees to the vertical.

16. The glass-melting furnace of claim 15 in which the downstream burner is mounted at an angle of up to about 20 degrees to the vertical.

17. A glass-melting furnace comprising:
an elongated channel consisting of a charge end wall, a discharge end wall, two side walls, a floor, and a roof the elongated channel defining an upstream melting end and a downstream fining end though which molten glass is discharged, the upstream end being positioned upstream of the downstream end in the glass-melting furnace;

the upstream end and the downstream end being configured to allow unimpeded flowing and blending of melting glass-forming material;

an exhaust disposed within with the glass-melting furnace, the exhaust having a centerline that is positioned at least about 70 percent of the distance from the charge end wall of the glass-melting furnace to the discharge end wall of the glass-melting furnace for exhausting combustion gases in the glass-melting furnace;

the exhaust disposed for allowing exhaust gases to provide additional heat to the melting glass-forming material, and for allowing at least some air-entrained glass-forming materials to scale back into the melting glass as exhaust gases travel from the upstream end to the downstream end.

18. The glass-melting furnace of claim 17 wherein the glass-melting furnace comprises two sidewalls and two exhausts, each exhaust being separated laterally from the sidewalls.

19. In a glass-melting furnace having an elongated channel consisting of a charge end wall, a discharge end wall, two side walls, a floor, and a root the elongated channel defining an upstream melting end and a downstream fining end through which molted glass is discharged, the upstream end being positioned upstream of the downstream end, the improvement comprising:

the upstream melting end and the downstream fining end being configured to allow unimpeded flowing and blending of melting glass-forming material;

an exhaust disposed within the glass-melting furnace at the downstream end of the glass-melting furnace for exhausting combustion gases in the glass-melting furnace only from the downstream end;

the exhaust disposed for allowing exhaust gases to provide additional heat to the melting glass-forming material, and for allowing at least some air-entrained glass-forming materials to scale back into the melting glass as exhaust gases travel from the upstream end to the downstream end.

20. The glass-melting furnace of claim 19 wherein the exhaust is disposed at the discharge end wall.

21. The glass-melting furnace of claim 19 wherein the exhaust comprises an exhaust stack.

22. The glass-melting furnace of claim 19 wherein the exhaust comprises a plurality of exhaust stacks.

23. A glass-melting furnace comprising:

an elongated channel consisting of a charge end wall a discharge end wall, two side walls, a floor, and a root the elongated channel defining an upstream melting end and a downstream fining end through which molten glass is discharged;

a charger supplying glass-forming material to the upstream end of the glass-melting furnace;

the upstream end and the downstream end being configured to allow unimpeded flowing and blending of melting glass-forming material; and at least one exhaust at the downstream end of the glass-melting furnace for exhausting combustion gases only from the at least one exhaust; the exhaust being disposed to i) allow exhaust gases to provide additional heat to the melting glass-forming material, and ii) allow at least some air-entrained glass-forming materials to settle back into the melting glass as exhaust gases travel from the upstream end to the downstream end.

24. The glass-melting furnace of claim 23 in which the at least one exhaust has a centerline that is positioned at least about 70 percent of the distance from the upstream end to the downstream end of the glass-melting furnace.

25. A glass-melting furnace comprising:

an elongated channel consisting of a charge end wall, a discharge end wall, two side walls, a floor, and a root the elongated channel defining an upstream melting end and a downstream fining end through which molten glass is discharged;

a charger supplying glass-forming material to the upstream end of the glass-melting furnace;

the upstream end and the downstream end being configured to allow unimpeded flowing and blending of melting glass-forming material;

at least one burner supplying heat to the glass-forming material at the upstream end of the glass-melting furnace; and one or more exhausts disposed only at the downstream end of the glass-melting furnace for exhausting combustion gases in the furnace only from the downstream end of the glass-melting furnace;

the exhaust disposed for allowing: i) exhaust gases to provide additional heat to the melting glass-forming material, and ii) at least some air-entrained glass-forming materials to settle back into the melting glass as exhaust gases travel from the upstream end to the downstream end.

26. The glass-melting furnace of claim 25 in which the one or more exhausts have centerlines that are positioned at least about 70 percent of the distance from the upstream end to the downstream end of the glass-melting furnace.

27. A glass-melting furnace comprising:

an elongated channel consisting of a charge end wall, a discharge end wall, two side walls, a floor, and a root the elongated channel defining a melting zone first halt and a fining zone second half through which molten glass is discharged;

a charger supplying glass-forming material to a charge end of the first half of the glass-melting furnace;

the upstream end and the downstream end being configured to allow unimpeded flowing and blending of melting glass-forming material;

at least one burner supplying heat to the glass-forming material in the first half of the glass-melting furnace; and at least one exhaust disposed within the second half of the glass-melting furnace and no exhaust disposed within the first half of the glass-melting furnace for exhausting combustion gases only from the second half of the glass-melting furnace;

the exhaust disposed for allowing: i) exhaust gases to provide additional heat to the melting glass-forming material, and ii) at least some air-entrained glass-forming materials to settle back into the melting glass as exhaust gases travel from the upstream end to the downstream end.

28. The glass-melting furnace of claim 27 wherein the first half defines a charge end and the second half defines a discharge end, the at least one exhaust having a centerline that is positioned at least about 70 percent of the distance from the upstream end to the downstream end of the glass-melting furnace.

* * * * *